July 30, 1963 R. A. KOBLE ETAL 3,099,525
METHOD OF CARBONATE LEACHING URANIUM ORE
Filed Sept. 26, 1960 3 Sheets-Sheet 1

INVENTORS.
R. A. KOBLE
H. W. GOARD
BY
*Hudson & Young*

ATTORNEYS

July 30, 1963  R. A. KOBLE ETAL  3,099,525
METHOD OF CARBONATE LEACHING URANIUM ORE
Filed Sept. 26, 1960  3 Sheets-Sheet 2

INVENTORS.
R.A. KOBLE
H.W. GOARD
BY
Hudson & Young
ATTORNEYS

United States Patent Office 3,099,525
Patented July 30, 1963

3,099,525
METHOD OF CARBONATE LEACHING URANIUM ORE
Robert A. Koble and Howard W. Goard, Bartlesville, Okla., assignors to Phillips Petroleum Company, a corporation of Delaware
Filed Sept. 26, 1960, Ser. No. 58,486
15 Claims. (Cl. 23—14.5)

This invention relates to an improved method of recovering uranium values from a uranium-containing ore. In one specific aspect, this invention relates to an improved method of carbonate leaching a uranium-containing ore.

In a process typical to the industry, ore comprising uranium-containing minerals is crushed, screened, and directed to a ball mill. In the ball mill the ore is wet ground in contact with an ammonium or soluble alkaline metal carbonate-bicarbonate solution. The prepared slurry leaves the ball mill and passes through a classifier where over-sized particles are returned to the ball mill. The remaining slurry passes on to a thickener. The thickened slurry of ore in an ammonium or soluble alkaline metal carbonate-bicarbonate solution is contacted with air in a leaching step, and is then filtered to generate a solution termed "pregnant liquor." The filtering operation can be conducted with a single filter, or filters in series or parallel relationship with each other. In concentrating uranium values from the pregnant liquor, the process of precipitating uranium values in the form of yellow cake is employed by the addition of a precipitating agent, such as sodium hydroxide, to the pregnant liquor. The yellow cake is filtered from the solution, and the filtrate recarbonated and recycled to the leaching step.

Employing the outlined conventional process results in a loss of sodium ion, a loss of uranium values with the discarded residual ore, and the necessity of handling large volumes of flowing material.

Accordingly, an object of this invention is to provide an improved method of recovering uranium values from a uranium-containing ore.

Another object of this invention is to provide an improved method of carbonate leaching the uranium values from a uranium-containing ore.

Another object of this invention is to provide an improved method of separating the carbonate leach liquor containing the dissolved uranium values from the residual ore.

Another object of this invention is to provide an improved method of recovering uranium values from a uranium-containing ore by reducing the cost of chemicals necessary to the separation process.

Other objects, advantages, and features of our invention will be readily apparent to those skilled in the art from the following description and the appended claims.

We have discovered an inventive process whereby the loss of sodium ion in the carbonate leaching of a uranium ore is reduced and the loss of uranium values with the residual ore is minimized. Broadly, this is accomplished by providing an improved method of washing residual uranium bearing solution from the leached ore in the filtration step.

Figure 1:
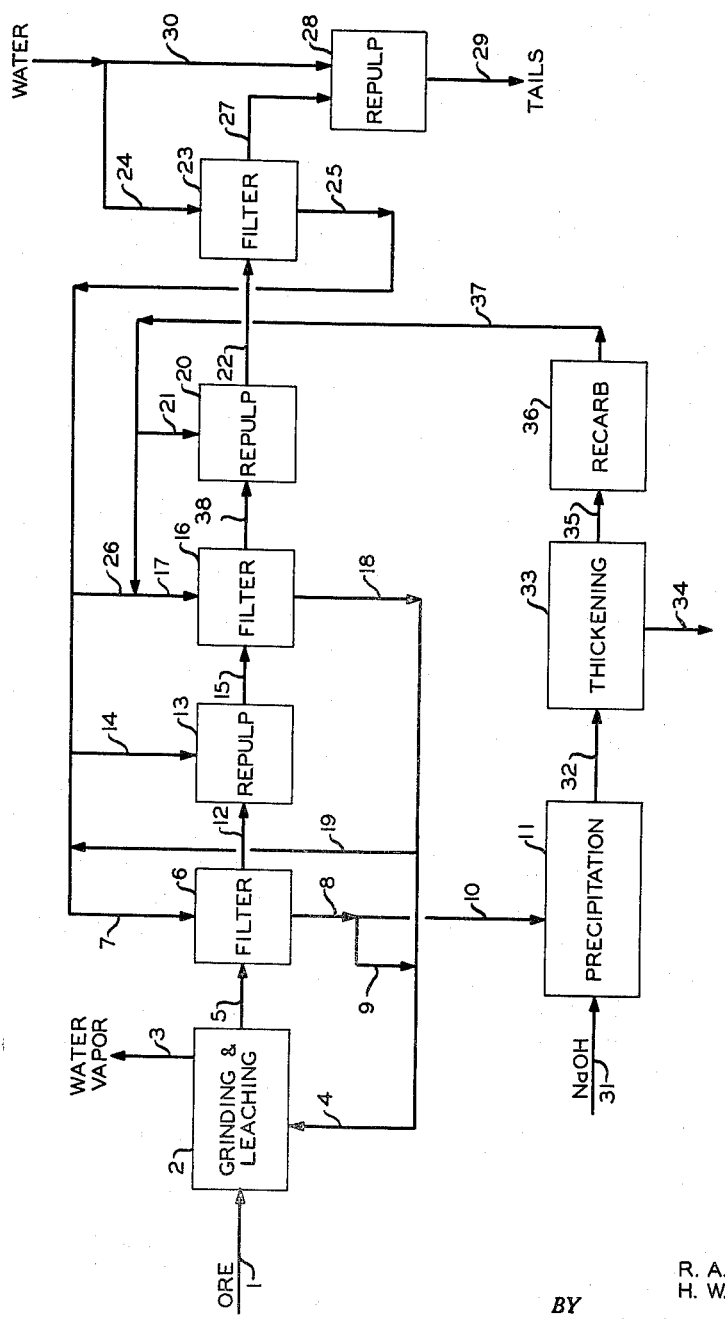
FIGURE 1 is a schematic diagram of one embodiment of the inventive process.

Referring to the drawings, the inventive process will first be discussed as exemplified by FIGURE 1. For purposes of simplification, all figures hereinafter disclosed are based upon one ton of uranium-containing ore introduced to the grinding and leaching zone 2 by means of line 1. The concentration of $U_3O_8$ in the ore charged is 4.5 pounds. Within the grinding and leaching zone, the ore is ground and leached with 2,140 pounds of sodium carbonate-bicarbonate leach solution containing 86.1 pounds of sodium ion. Water vapor is passed from the grinding and leaching zone to the atmosphere by means of line 3. The prepared slurry is passed from the grinding and leaching zone 2, by means of line 5 to a filter 6. The liquid to ore ratio of the slurry passed to filter 6 is approximately 1.0 on a pound basis. By means of filter 6, inert solids are filtered from the pregnant solution containing the dissolved uranium values. The filtered solids are washed with 807 pounds of sodium carbonate-bicarbonate solution containing 30.3 pounds of sodium ion and 0.7 pound of $U_3O_8$ passed to filter 6 by means of line 7.

The filtrate and wash solutions from filter 6 are combined in line 8 and a portion of the combined solution recycled by means of lines 9 and 4 to the grinding and leaching zone 2. The remainder of the combined solution is passed by means of line 10 to a precipitation zone 11. The filtered solids from filter 6 are passed by means of line 12 to a repulp zone 13 wherein said solids are contacted with 410 pounds of solution containing 17.3 pounds of sodium ion and 0.089 pound of $U_3O_8$ passed to repulp zone 13 by means of line 14. The prepared slurry is passed from the repulp zone 13 by means of line 15 to a filter 16. The solids are filtered from the solution and washed with 867 pounds of solution containing 25.2 pounds of sodium ion and 0.15 pound of $U_3O_8$ passed to filter 16 by means of line 17. The filtrate and wash solutions from filter 16 are combined in line 18 and a portion of the combined solution passed by means of lines 19 and 7 to filter 6. The remainder of the solution from filter 16 is passed by means of lines 18 and 4 to the grinding and leaching zone 2. The filtered solids from filter 16 are passed by means of line 38 to a repulp zone 20 wherein said solids are contacted with 410 pounds of sodium carbonate-bicarbonate solution containing 25.5 pounds of sodium ion and 0.04 pound of $U_3O_8$ passed to said repulp zone 20 by means of line 21.

The prepared slurry from repulp zone 20 is passed by means of line 22 to a filter 23. The solids are filtered from the solution and washed with 807 pounds of water passed to filter 23 by means of line 24. The filtrate and wash solutions from filter 23 are combined in line 25 and a portion of the combined solution is passed by means of lines 25, 26 and 17 to filter 16. Another portion of the combined solution from filter 23 is passed by means of lines 25 and 14 to repulp zone 13 and the remainder of the solution from filter 23 is passed by means of lines 25 and 7 to filter 6. The filtered solids are removed from filter 23 by means of line 27 and passed to a repulp zone 28 wherein a slurry is prepared by passing water to said repulp zone 28 by means of line 30. The residual ore slurry containing 0.04 pound of $U_3O_8$ and 5.3 pounds of sodium ion is then discarded by means of line 29.

The pregnant carbonate leach liquor from filter 6 containing dissolved uranium values is passed to precipitation zone 11 wherein said leach liquor is contacted with a sodium hydroxide solution containing 5.8 pounds of sodium ion introduced to precipitation zone 11 by means of line 31. The ratio of pregnant liquor charged to precipitation zone 11 to the ore charged to grinding and leaching zone 2, hereinafter referred to as the pregnant liquor to ore ratio, is maintained at 0.35 on a pound basis. The prepared slurry containing precipitated uranium values in the form of yellow cake is passed by means of line 32 to a thickening zone 33. In said thickening zone 33 the yellow cake is thickened, filtered and washed free of solution by conventional means. The product yellow cake containing 4.46 pounds $U_3O_8$ is recovered by means of line 34. The product yellow cake also contains 0.5 pound sodium ion. The filtrate from thickening zone 33 is passed by means of line 35 to a recarbonating zone 36. From recarbonating zone 36, 700 pounds of a recarbonated solution containing 35.0 pounds of sodium ion and 0.30 pound $U_3O_8$ is passed by means of lines 37, 21 and 17 to repulp zone 20 and filter 16.

Figure 2:
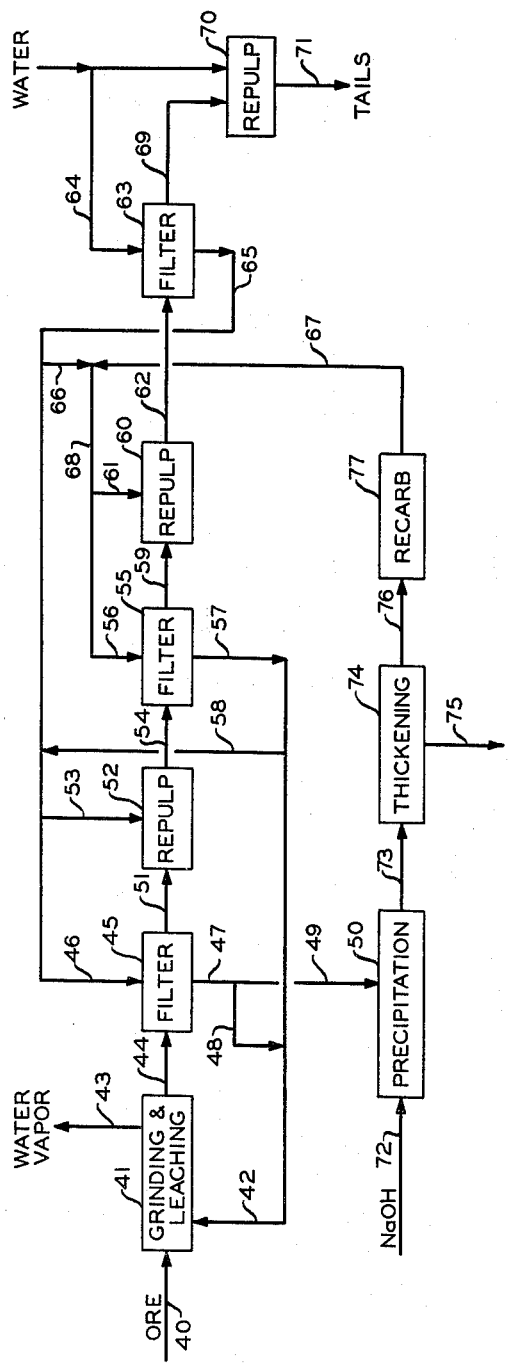
FIGURE 2 is a schematic diagram of another embodiment of the inventive process.

Referring to FIGURE 2, the inventive process will again be discussed as it applies to one ton of uranium-containing ore charged to a grinding and leaching zone 41 by means of line 40. The concentration of $U_3O_8$ in the charged ore is again 4.5 pounds. The ore is ground and leached with 2,140 pounds of sodium carbonate-bicarbonate solution supplied by means of line 42 to said grinding and leaching zone 41, said carbonate leach solution containing 85.7 pounds of sodium ion and 8.75 pounds of $U_3O_8$. Water vapor is removed from the grinding and leaching zone 41 by means of line 43. The prepared slurry containing 2,000 pounds of liquid per ton of ore is passed by means of line 44 to filter 45. Solids are filtered from the solution and washed with 807 pounds of solution containing 24.8 pounds of sodium ion and 0.48 pound of $U_3O_8$ passed to filter 45 by means of line 46. The filtrate and wash solutions from filter 45 are combined in line 47 and a portion of said combined solution passed by means of lines 47, 48 and 42 to said grinding and leaching zone 41. The remainder of the combined solution from filter 45 is passed by means of line 49 to a precipitation zone 50. The filtered solids from filter 45 are passed by means of line 51 to a repulp zone 52. The solids are contacted in repulp zone 52 with 1217 pounds of solution containing 39.2 pounds of sodium ion and 0.43 pound of $U_3O_8$ passed to repulp zone 52 by means of line 53.

The prepared slurry is passed from repulp zone 52 by means of line 54 to a filter 55 wherein the solids are filtered from the solution. The solids are washed with 867 pounds of solution containing 36.9 pounds of sodium ion and 0.11 pound of $U_3O_8$ introduced to filter 55 by means of line 56. The filtrate and wash solutions are combined in line 57 and a portion of the combined solution is passed by means of lines 57, 58 and 53 to repulp zone 52. Another portion of the combined solution from filter 55 is passed by means of lines 57, 58 and 46 to filter 45 and the remainder of the combined solution from filter 55 is passed by means of lines 57 and 42 to the grinding and leaching zone 41. The filtered solids are passed by means of line 59 to a repulp zone 60 wherein said solids are contacted with 410 pounds of solution containing 17.5 pounds of sodium ion and 0.06 pound of $U_3O_8$ to said repulp zone 60 by means of line 61.

The prepared slurry is passed from repulp zone 60 by means of line 62 to a filter 63 wherein the solids are filtered from the solution. The filtered solids are washed with 807 pounds of water supplied by means of line 64. The filtrate and wash solutions from filter 63 are combined in line 65 and a portion of the combined solution passed as repulp solution to repulp zone 60 by means of lines 65, 66, 68 and 61. Another portion of the combined solution in filter 63 is passed by means of lines 65, 66, 68 and 56 to filter 55 as wash solution. A third portion of the combined solution in filter 63 is passed by means of lines 65 and 53 to repulp zone 52 and the remainder of the combined solution is passed by means of lines 65 and 46 to filter 45 as wash solution. The filtered solids containing 0.037 pound $U_3O_8$ and 5.8 pounds of sodium ion are passed from filter 63 by means of line 69 to repulp zone 70 wherein the solids are contacted with water and discarded as residue by means of line 71.

The pregnant carbonate leach liquor from filter 45 with a pregnant liquor to ore ratio of 0.39 is contacted in precipitation zone 50 within a sodium hydroxide solution containing 6.3 pounds of sodium ion introduced to precipitation zone 50 by means of line 72. The prepared slurry containing the uranium values in the form of precipitated yellow cake is passed by means of line 73 to thickening zone 74. The slurry is thickened and the yellow cake filtered from the slurry by conventional means. Product yellow cake containing 4.46 pounds of $U_3O_8$ and 0.5 pound of sodium ion is recovered by means of line 75. Filtrate from the thickening zone 74 is passed by means of line 76 to a recarbonation zone 77. A recarbonated solution containing 38.3 pounds of sodium ion and 0.07 pound of $U_3O_8$ is removed from the recarbonation zone 77 by means of line 67. A portion of the recarbonated solution removed from recarbonation zone 77 is passed by means of lines 67, 68 and 61 to repulp zone 60. The remainder of the recarbonated solution removed from recarbonation zone 77 is passed by means of lines 67, 68 and 56 to filter 55 as wash solution.

Figure 3:
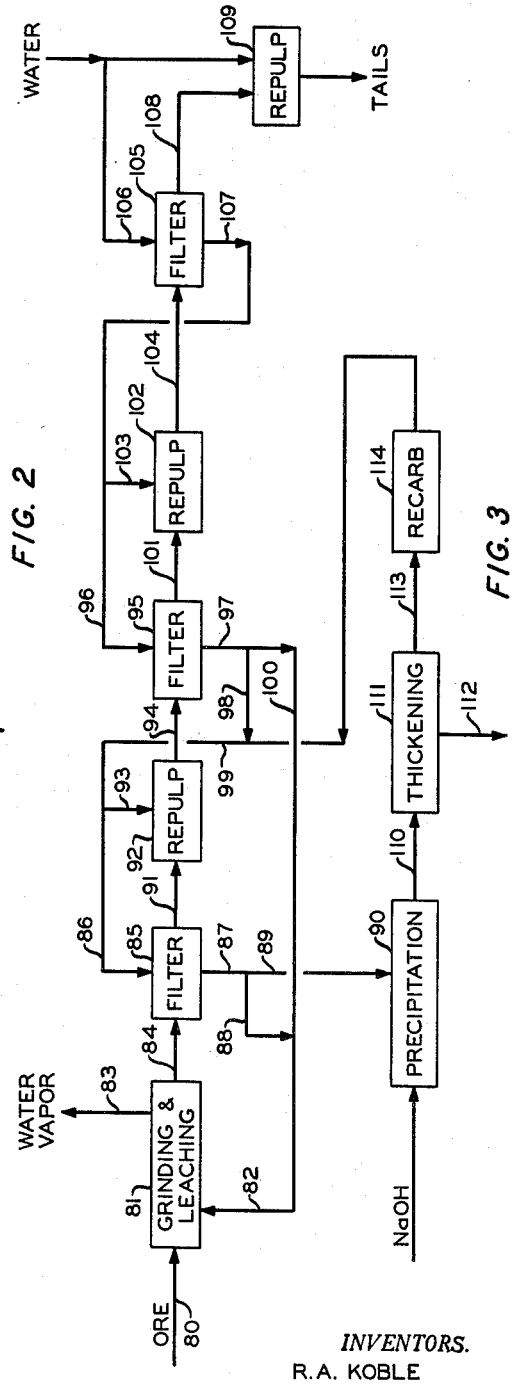
FIGURE 3 is a schematic diagram of yet another embodiment of the inventive process.

Referring to FIGURE 3, the inventive process will be discussed as it applies to one ton of ore containing 4.5 pounds of $U_3O_8$ charged to a grinding and leaching zone 81 by means of line 80. The ore is ground within said grinding and leaching zone 81 and leached with 2,140 pounds of sodium carbonate-bicarbonate solution containing 229.9 pounds of sodium ion and 7.65 pounds of $U_3O_8$ introduced to said grinding and leaching zone 81 by means of line 82. Water vapor is removed from grinding and leaching zone 81 by means of line 83. The prepared slurry containing the uranium values in solution is passed by means of line 84 to a filter 85. The ratio of liquid to the solid inert ore charged to filter 85 is approximately 1.0 on a pound basis. The ore is filtered from the pregnant carbonate leach liquor by filter 85 and washed with 1,001 pounds of solution containing 116.7 pounds of sodium ion and 0.285 pound of $U_3O_8$ introduced to filter 85 by means of line 86. The filtrate and washing solutions from filter 85 are combined in line 87 and a portion of said combined solution recycled to the grinding and leaching zone 81 by means of lines 87, 88 and 82. The remainder of the combined solution from filter 85 is passed by means of lines 87 and 89 to a precipitation zone 90. The filtered solids from filter 85 are passed by means of a line 91 to a repulp zone 92 wherein said solids are contacted with 410 pounds of repulp solution containing 48.0 pounds of sodium ion and 0.18 pound of $U_3O_8$ introduced to repulp zone 92 by means of line 93.

The prepared slurry is passed from repulp zone 92 by means of a line 94 to a filter 95 wherein the ore is filtered and washed with 807 pounds of solution containing 30.0 pounds of sodium ion and 0.18 pound of $U_3O_8$ introduced to filter 95 by means of line 96. The filtrate and wash solutions from filter 95 are combined in line 97. A portion of the combined solution is passed to repulp zone 92 by means of lines 97, 98, 99 and 93. A second portion of the combined solution is passed to filter 85 by means of lines 97, 98, 99 and 86, and the remaining portion of the combined solution is recycled to the grinding and leaching zone 81 by means of lines 97, 100, and 82. The solids from filter 95 are passed by means of line 101 to repulp zone 102 wherein said solids are contacted with 410 pounds of solution containing 15.3 pounds of sodium ion and 0.08 pound of $U_3O_8$ introduced to repulp zone 102 by means of line 103.

The prepared slurry is passed from repulp zone 102 by means of line 104 to a filter 105. The solids are filtered from the solution and washed with 807 pounds of water introduced to filter 105 by means of line 106. The filtrate and wash solutions from filter 105 are combined in line 107 and a portion of the combined solution is passed to repulp zone 102 by means of lines 107 and 103. The remaining portion of said combined solution is passed by means of lines 107 and 96 to filter 95. Solids from filter 105 are passed by means of line 108 to a repulp zone 109 wherein said solids are contacted with water and the resulting slurry containing 0.041 pound of $U_3O_8$ and 6.7 pounds of sodium ion discarded.

The pregnant carbonate leach liquor solution from filter 85 with a pregnant liquor to ore ratio of 0.45 is contacted with a sodium hydroxide solution containing 7.2 pounds of sodium ion in a precipitation zone 90. A prepared slurry containing the uranium values as precipitated yellow cake is passed by means of line 110 to a thickening zone 111. Within said thickening zone 111, the yellow cake slurry is thickened and the yellow cake filtered and removed as product by means of line 112. The product yellow cake contains 4.46 pounds of $U_3O_8$ and 0.5 pound of sodium ion. The filtrate from thickening zone 111 is passed to recarbonation zone 114 by means of a line 113. A recarbonated solution containing 11.8 pounds of sodium ion and 0.08 pound of $U_3O_8$ is removed from recarbonation zone 114 by means of line 99. A portion of the recarbonated solution from recarbonation zone 114 is passed to repulp zone 92 as a wash solution by means of lines 99 and 93. The remainder of the carbonated solution is passed by means of lines 99 and 86 to filter 85 as wash solution.

To demonstrate the efficiency of the inventive process, a comparison is made with a conventional process, hereinafter referred to as the base case, for the recovery of uranium values from a uranium-containing ore. Referring once again to FIGURE 1, altered by removing lines 19 and 26, the base case will be discussed as it applies to one ton of uranium-containing ore charged to grinding and leaching zone 2. The concentration of $U_3O_8$ in the ore charged is 4.5 pounds. Within the grinding and leaching zone 2, the ore is ground and leached with 2,140 pounds of sodium carbonate-bicarbonate leach solution containing 98.6 pounds of sodium ion. The prepared slurry from the grinding and leaching zone 2 having a liquid to ore ratio of approximately 1.0 is charged to filter 6 by means of line 5. The solids are filtered from the solution and washed with 807 pounds of solution containing 32.8 pounds of sodium ion and 0.15 pound of $U_3O_8$. The filtrate and wash solutions from filter 6 are combined in line 8 and a portion of said combined solution recycled by means of lines 9 and 4 to grinding and leaching zone 2. The remainder of said combined solution is passed by means of lines 8 and 10 to precipitation zone 11. The filtered solids are passed from filter 6 to a repulp zone 13 by means of line 12 wherein the solids are contacted with 410 pounds of solution containing 16.6 pounds of sodium ion and 0.08 pound of $U_3O_8$.

The prepared slurry is then passed to a filter 16 by means of line 15 wherein the solids are filtered from the solution and washed with 590 pounds of solution containing 32.8 pounds of sodium ion and 0.05 pound of $U_3O_8$. The combined filtrate and wash solutions from filter 16 are recycled to the grinding and leaching zone 2 by means of lines 18 and 4. The filtered solids from filter 16 are passed to a repulp zone 20 by means of line 38. Within repulp zone 20, said solids are contacted with 410 pounds of solution containing 22.7 pounds of sodium ion and 0.4 pound of $U_3O_8$.

The prepared slurry is then passed to filter 23 by means of line 22 wherein the solids are filtered from the solution and washed with 807 pounds of water. The filtrate and wash solutions from filter 23 are combined and passed to filter 6 as wash solution and to repulp zone 13 as repulp solution. The filtered solids are passed from filter 23 to a repulp zone 28 wherein they are contacted with water and passed to a residue pond. The residual ore contains 7.8 pounds of sodium ion and 0.034 pound of $U_3O_8$.

A pregnant carbonate leach liquor containing dissolved uranium values with a pregnant liquor to ore ratio of 0.5 is passed from filter 6 to precipitation zone 11 wherein said leach liquor is contacted with a sodium hydroxide solution containing 7.8 pounds of sodium ion introduced to precipitation zone 11 by means of line 31. A prepared slurry containing precipitated uranium values in the form of yellow cake is passed by means of line 32 to a thickening zone 33. In said thickening zone 33, the yellow cake is thickened, filtered and washed free of solution by conventional means. The product yellow cake containing 4.47 pounds of $U_3O_8$ and 0.5 pound of sodium ion is recovered by means of line 34. The filtrate from thickening zone 33 is passed by means of line 35 to a recarbonating zone 36. From recarbonating zone 36, 1,000 pounds of recarbonated solution containing 55.5 pounds of sodium ion and 0.09 pound of $U_3O_8$ is passed by means of line 37 to filter 16 and repulp zone 20.

For comparison purposes, the results of this conventional process, labeled as run 4, are shown in Table I with the results of runs 1, 2 and 3 of FIGURES 1, 2 and 3, respectively. The results obtained for each run are based upon one ton of ore containing 4.5 pounds of $U_3O_8$ charged to the grinding and leaching zone.

*Table I*

| Run No. | Preg. Liquor to Ore Ratio | Yellow Cake Product | | Residue | |
|---|---|---|---|---|---|
| | | $U_3O_8$, lbs. | Sodium Ion, lbs. | $U_3O_8$, lbs. | Sodium Ion, lbs. |
| 1 | 0.35 | 4.46 | 0.5 | .039 | 5.3 |
| 2 | 0.39 | 4.46 | 0.5 | .037 | 5.8 |
| 3 | 0.45 | 4.46 | 0.5 | .041 | 6.7 |
| 4 | 0.50 | 4.47 | 0.5 | .034 | 7.3 |

Table I clearly demonstrates the advantage of the inventive process in thus reducing the sodium ion lost during the carbonate leaching of the uranium-containing ore. The net result is a considerable savings in the cost of processing uranium ore by comparing the process cost attributed to the loss of sodium ion plus the loss of $U_3O_8$ with the residual ore for run 1 having a second filter wash ratio of 1.3 and run 4 (base case); it is found that the loss attributed to run 1 is 0.75 dollar/ton and for run 4, 0.86 dollar/ton, by FIGURE 4; this is a significant improvement.

The inventive process of separating uranium values from uranium-containing ore has been discussed as it applies to the sodium carbonate leaching of a uranium ore wherein additional sodium carbonate was not added to the slurry during the leaching step. The scope of the inventive process also includes those process methods wherein additional soda ash, not herein illustrated by FIGURES 1, 2 and 3, is added during the leaching step. In this manner, a specific sodium ion concentration can be maintained throughout the leaching process.

The inventive processes disclosed and discussed in FIGURES 1, 2 and 3 were fixed as to the ratio of pregnant liquor to ore charged to the precipitation zone and the filter wash ratios employed. It is, of course, understood that it is within the scope of this invention to employ a range of wash and pregnant liquor to ore ratios. A preferred ratio range of pregnant liquor to ore, but not necessarily limited thereto, is 0.25 to 0.75 on a pound basis.

The term "wash ratio" refers to the pounds of wash solution applied to the filtered cake per pound of solution remaining in the filter cake after the filtering and washing operation is complete for that particular filter involved. The filter wash ratios of the first and third filters of the inventive process of FIGURES 1, 2 and 3 are maintained in the range of 1.0 to 2.5, preferably in the range of 1.1 to 1.3. The filter wash ratio of the second filter of FIGURES 1, 2 and 3 is maintained in the range of 1.0 to 3.5, preferably in the range of 1.0 to 1.9.

As noted, it is conventional to recycle a portion of the pregnant liquor from the first stage filter to the grinding and leaching zone in order to reduce the sodium hydroxide required to precipitate the uranium yellow cake. This conventional process recycle also reduces the quantity of recarbonated liquor available for washing the second stage filter and as repulping liquid in the second stage repulp zone. The result is an increased loss of $U_3O_8$ with the residual ore.

The inventive process replaces this lost wash and repulp liquids with other liquids so that not only is the loss of $U_3O_8$ minimized, but an additional recycle of pregnant liquor is permissible. This results in again reducing the amount of sodium hydroxide required, reducing the sodium ion loss and permitting a greater part of the sodium makeup to be with sodium carbonate in the grinding step.

Figure 4:
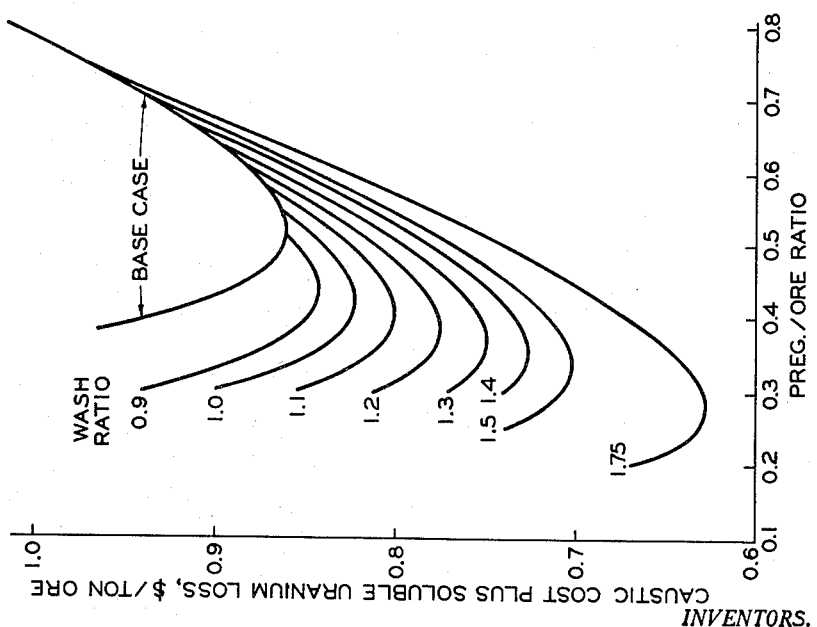
FIGURE 4 is a graphical representation of the result of varying the second stage filter wash on the caustic soda cost plus soluble uranium loss.

The importance of maintaining proper wash ratios to the filters and of maintaining an optimum pregnant liquor to ore ratio charged to the first filter is illustrated by FIGURE 4. In order to reduce the sodium ion consumption added in the form of sodium hydroxide and the loss of uranium values in the carbonate leaching of uranium ore, the caustic soda cost plus uranium loss is determined for specific pregnant liquor to ore and second filter wash ratios for the inventive process of FIGURE 1 and for the base case. The wash ratio for the first and third filters is maintained at 1.2. The percent solids charged to the second and third filters is maintained at 65 and the percent solids to the first filter is maintained at 50. The wash ratio of the second filter is as noted.

At a constant pregnant liquor to ore ratio, the sodium ion requirement is constant. Therefore, FIGURE 4 demonstrates that with all other factors remaining constant, by increasing the wash ratio for a particular pregnant liquor to ore ratio, there is a reduction in uranium loss.

Figure 5:
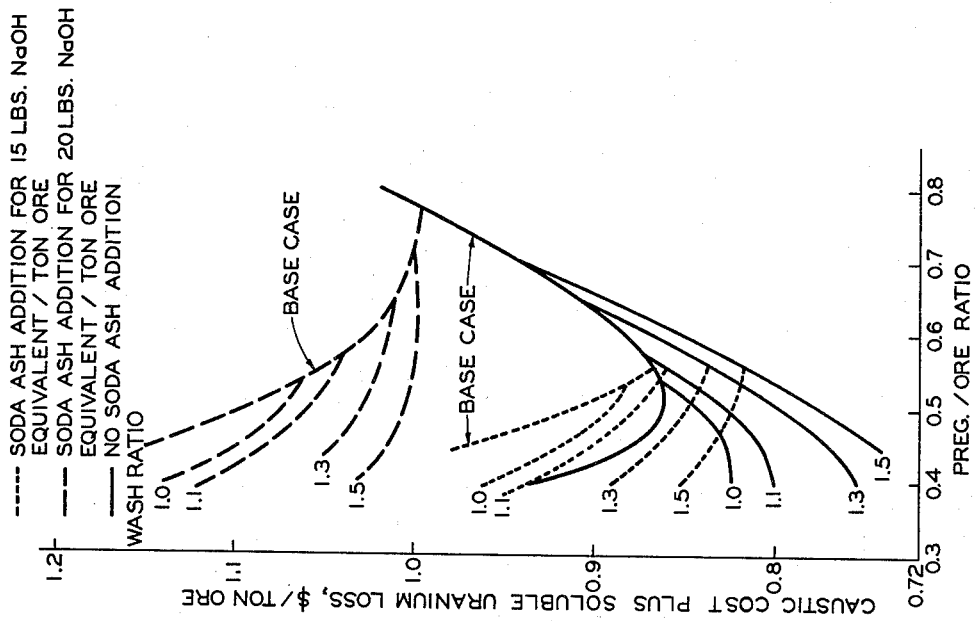
FIGURE 5 is a graphic representation of the effect of soda ash addition on the caustic cost plus soluble uranium loss.

FIGURE 5 illustrates the effect of altering the wash and the pregnant liquor to ore ratio while adding sufficient soda ash in the leaching zone to maintain a specific sodium ion concentration in the leach liquor. The inventive process as depicted by FIGURES 1, 2 and 3 permitted the sodium ion concentration to seek its equilibrium level. The loss of sodium ion is reduced by eliminating soda ash addition in the leaching zone. The optimum pregnant liquor to ore ratio will depend upon the rate of soda ash addition to the leaching zone and the second filter wash ratio. FIGURE 5 further demonstrates, however, that by increasing the wash ratio on the second filter in those cases where soda ash has been added during the leaching step, a decrease in uranium loss is the result.

In order to reduce the caustic consumption necessary to the conventional leaching process, it is necessary to decrease the pregnant liquor to ore ratio charged to the precipitation zone as the caustic consumption is dependent upon the volume of pregnant liquor. In reducing the pregnant liquor to ore ratio according to the conventional process, the wash available for the first and second filters is reduced. This reduction, as shown by FIGURES 4 and 5 will result in an increased uranium loss. This loss of wash liquid is compensated for by the filter washing procedures of the inventive process. The net result may be that uranium loss may actually be increased slightly in comparison to a process employing a higher pregnant liquor to ore ratio, but the caustic consumption of said higher pregnant liquor to ore ratio process would be high. But FIGURES 4 and 5 clearly illustrate a substantial decrease in the total cost attributed to the sodium ion loss plus uranium loss when a uranium-containing ore is carbonate leached by the inventive process in comparison with a conventional leaching process as depicted by the base case.

As will be evident to those skilled in the art, various modifications of this invention can be made, or followed, in the light of the foregoing disclosure and discussion, without departing from the spirit or scope thereof.

We claim:

1. In a process of extracting uranium values from a disintegrated uranium-containing ore comprising the steps of contacting said ore with a carbonate leach solution in a contact zone, said carbonate leach solution selected from the group consisting of ammonium and soluble alkaline metal carbonate-bicarbonate solutions, passing the resulting slurry from said contact zone to a first filtration zone, filtering inert solids from the pregnant carbonate leach liquor containing said uranium values in solution, withdrawing a filtrate from said first filtration zone, washing said filtered inert solids with a first wash solution hereinafter described, recycling at least a portion of the combined filtrate and wash solution removed from said first filtration zone to said contact zone, passing said filtered solids from said first filtration zone to a first repulp zone, contacting said solids in said first repulp zone with a first repulp solution, hereinafter described, passing the resulting slurry from said first repulp zone to a second filtration zone, filtering the inert solids from said first repulp solution in said second filtration zone, washing said filtered inert solids with a second wash solution hereinafter described, passing said inert solids from said second filtration zone to a second repulp zone, contacting said inert solids with a second repulp solution hereinafter described, passing the resulting slurry from said second repulp zone to a third filtration zone, filtering the inert solids from said second repulp solution, washing said filtered inert solids with water; an improvement wherein said first wash solution and said first repulp solution are comprised of at least a portion of the combined filtrate and wash solution removed from said third filtration zone and at least a portion of the combined filtrate and wash solution removed from said second filtration zone, said second wash solution and said second repulp solution is comprised of a recarbonated leach solution and at least a portion of said combined filtrate and wash solution removed from said third filtration zone.

2. In a process of extracting uranium values from a disintegrated uranium-containing ore comprising the steps of contacting said ore with a carbonate leach solution in a contact zone, said carbonate leach solution selected from the group consisting of ammonium and soluble alkaline metal carbonate-bicarbonate solutions, passing the resulting slurry from said contact zone to a first filtration zone, filtering inert solids from the pregnant carbonate leach liquor containing said uranium values in solution, withdrawing a filtrate from said first filtration zone, washing said filtered inert solids with a first wash solution hereinafter described, recycling at least a portion of the combined filtrate and wash solution removed from said first filtration zone to said contact zone, passing said filtered solids from said first filtration zone to a first repulp zone, contacting said solids with a first repulp solution hereinafter described, passing the resulting slurry from said first repulp zone to a second filtration zone, filtering the inert solids from said first repulp solution, washing said filtered solids with a second wash solution hereinafter described, passing said inert solids from said second filtration zone to a second repulp zone, contacting said inert solids with a second repulp solution hereinafter described, passing the resulting slurry from said second repulp zone to a third filtration zone, filtering the inert solids from said second repulp solution, washing said filtered inert solids with water; an improvement wherein said first wash solution is comprised of at least a portion of the combined filtrate and wash solution removed from said second filtration zone and at least a portion of the combined filtrate and wash solution removed from said third filtration zone, said first repulp solution is comprised of at least a portion of the combined filtrate and wash solution removed from said third filtration zone, said second wash solution is comprised of a recarbonated leach solution and at least a portion of the combined filtrate and wash solution removed from said third filtration zone, and said second repulp solution is comprised of a recarbonated leach solution.

3. A process of extracting uranium values from a disintegrated uranium-containing ore comprising the steps of contacting said ore with a carbonate leach solution in a contact zone, said carbonate leach solution selected from the group consisting of ammonium and soluble alkaline metal carbonate-bicarbonate solutions, passing the resulting slurry from said contact zone to a first filtration zone, filtering inert solids from the pregnant carbonate leach liquor containing said uranium values in solution, withdrawing a filtrate from said first filtration zone, washing said filtered inert solids with a first wash solution hereinafter described, recycling at least a portion of the combined filtrate and wash solution removed from said first filtration zone to said contact zone, passing said filtered solids from said first filtration zone to a first repulp zone, contacting said solids with a first repulp solution hereinafter described, passing the resulting slurry from said first repulp zone to a second filtration zone, filtering the inert solids from said first repulp solution, washing said filtered inert solids with a second wash solution hereinafter described, passing said inert solids from said second filtration zone to a second repulp zone, contacting said inert solids with a second repulp solution hereinafter described, passing the resulting slurry from said second repulp zone to a third filtration zone, filtering the inert solids from said second repulp solution, washing said filtered inert solids with water; an improvement wherein said first wash solution and said first repulp solution is comprised of a recarbonated leach solution and at least a portion of the combined filtrate and wash solution from said second filtration zone, said second wash solution and said second repulp solution are comprised of the combined filtrate and wash solution from said third filtration zone.

4. The process of claim 1 wherein the ratio of wash solution passed to each of the first and third filtration zones to the solution remaining with the filtered solids removed from each of said first and third filtration zones is maintained in the range of 1.0 to 2.5 on a weight basis, and wherein the ratio of wash solution passed to the second filtration zone to the solution remaining with the filtered solids removed from the second filtration zone is maintained in the range of 1.0 to 3.5 on a weight basis.

5. The process of claim 1 wherein the ratio of wash solution passed to each of the first and third filtration zones to the solution remaining with the filtered solids removed from each of said first and third filtration zones is maintained in the range of 1.1 to 1.3 on a weight basis, and wherein the ratio of wash solution passed to the second filtration zone to the solution remaining with the filtered solids removed from the second filtration zone is maintained in the range of 1.0 to 1.9 on a weight basis.

6. The process of claim 2 wherein the ratio of wash solution passed to each of the first and third filtration zones to the solution remaining with the filtered solids removed from each of said first and third filtration zones is maintained in the range of 1.0 to 2.5 on a weight basis, and wherein the ratio of wash solution passed to the second filtration zone to the solution remaining with the filtered solids removed from the second filtration zone is maintained in the range of 1.0 to 3.5 on a weight basis.

7. The process of claim 2 wherein the ratio of wash solution passed to each of the first and third filtration zones to the solution remaining with the filtered solids removed from each of said first and third filtration zones is maintained in the range of 1.1 to 1.3 on a weight basis, and wherein the ratio of wash solution passed to the second filtration zone to the solution remaining with the filtered solids removed from the second filtration zone is maintained in the range of 1.0 to 1.9 on a weight basis.

8. The process of claim 3 wherein the ratio of wash solution passed to each of the first and third filtration zones to the solution remaining with the filtered solids removed from each of said first and third filtration zones is maintained in the range of 1.0 to 2.5 on a weight basis, and wherein the ratio of wash solution passed to the second filtration zone to the solution remaining with the filtered solids removed from the second filtration zone is maintained in the range of 1.0 to 3.5 on a weight basis.

9. The process of claim 3 wherein the ratio of wash solution passed to each of the first and third filtration zones to the solution remaining with the filtered solids removed from each of said first and third filtration zones is maintained in the range of 1.1 to 1.3 on a weight basis, and wherein the ratio of wash solution passed to the second filtration zone to the solution remaining with the filtered solids removed from the second filtration zone is maintained in the range of 1.0 to 1.9, on a weight basis.

10. The process of claim 1 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

11. The process of claim 2 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

12. The process of claim 3 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

13. The process of claim 4 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

14. The process of claim 6 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

15. The process of claim 8 wherein at least a portion of the combined filtrate from said first filtration zone is passed to a precipitation zone so as to maintain a ratio of filtrate charged to said precipitation zone to the ore charged to said contact zone in the range of 0.25 to 0.75 on a weight basis.

References Cited in the file of this patent

UNITED STATES PATENTS 2,736,634     Gaudin _____ Feb. 28, 1916
2,813,003     Thunaes et al. _____ Nov. 12, 1957

OTHER REFERENCES

Clegg et al.: "Uranium Ore Processing," pp. 183–185, 287, 293, 315, 319 and 333 (1958).

AEC Document WIN 45, pp. 7–9, 21, 27, 33, 39, 44, 49, 54, 59, Apr. 5, 1956.

Butler et al.: "Eng. and Mining Journal," vol. 152, No. 3, pp. 59–62.